Patented Apr. 14, 1931

1,800,371

UNITED STATES PATENT OFFICE

GEORGE MAYNARD BARTLETT, OF HARTFORD, CONNECTICUT

PROCESS OF MAKING HEXACHLORETHANE

No Drawing.     Application filed May 9, 1925. Serial No. 29,233.

(GRANTED UNDER THE ACT OF MARCH 3, 1883, AS AMENDED APRIL 30, 1928; 370 O. G. 757)

This invention relates to a process of making hexachlorethane from carbon tetrachloride.

Among the objects of this invention is the provision of a process of making practically pure $C_2Cl_6$, which process is highly efficient, simple and easy to operate and which employs readily available materials.

A further object of this invention is to provide a process of making $C_2Cl_6$ wherein a valuable by-product is also obtained.

A still further object of this invention consists in a process of making $C_2Cl_6$ from $CCl_4$ and a metal, for example aluminum, the reaction being carried out in the presence of a halide of aluminum, for example aluminum chloride.

In carrying out my invention, I introduce metallic aluminum and aluminum chloride into carbon tetrachloride, heat the mixture, condense vapors formed by the heating and reflux or return the condensed liquids to the mixture. I have found that if a small amount of aluminum chloride is added to a mixture of $CCl_4$ and metallic aluminum and the mixture warmed to 60–70° C., the reaction proceeds very satisfactorily according to the following equation:

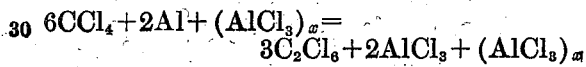

It will be observed that the small amount of $AlCl_3$ added to the reaction mixture appears in the final reaction product and there is also produced a substantial amount of $AlCl_3$ by the reaction.

The $CCl_4$ is employed in excess of the quantity required in the reaction with the metallic aluminum and this excess should be sufficient to dissolve the $C_2Cl_6$ produced by the reaction.

This invention described herein may be manufactured and used by or for the Government for Government purposes, without the payment to me of any royalty thereon.

A specific example of carrying out my process is as follows: About 1000 lbs. of $CCl_4$ is run into a reaction vessel, 34 lbs. of metallic aluminum and 5 lbs. of $AlCl_3$ are added and the mixture is heated. The physical condition of the aluminum influences the speed of reaction and the quantity of material produced and I have found that the proportion of 33 pounds of aluminum pellets and 1 pound of aluminum powder gives the best results. It should be understood, however, that these proportions may be altered and other forms of aluminum employed without departing from this invention. The reaction is conducted preferably at 65–75° C., and is continued for about 18 to 24 hours or until the reaction, as shown by control analysis, is practically complete. During this reaction the $CCl_4$ is subjected to condensation and the liquids condensed thereby returned to the mixture which is agitated so that the small amount of gummy by-products are removed from the metal, the aluminum pellets thus presenting a clean surface for reaction. Owing to the excess of $CCl_4$ employed, there remains unreacted a sufficient quantity of this re-agent to serve as a solvent for the $C_2Cl_6$ produced. This solution of $C_2Cl_6$ in $CCl_4$ is then filtered, thus separating the $AlCl_3$ therefrom, and the filtrate is distilled by ordinary heating. The $CCl_4$ that is removed by this distillation, which may be carried on at atmospheric pressure, is recovered for further use. The remaining crude $C_2Cl_6$ is then distilled with steam and condensed in a water spray. This distilled product is then filtered from the water and dried.

The $AlCl_3$, previously recovered from the reaction product, may be washed with $CCl_4$ and then purified by sublimation and condensation.

If it is not desired to recover the aluminum chloride, the treatment of the product after the reflux condensation has been completed may be modified by adding a quantity of water to the reaction product sufficient to decompose the $AlCl_3$. After this decomposition has taken place, the solution of $C_2Cl_6$ in $CCl_4$ may be drawn off and then distilled as heretofore described.

Although in the foregoing example, I have illustrated the use of aluminum, it is to be understood that my invention is not $6CCl_4 + 2Al + (AlCl_3)_x =$
$\qquad 3C_2Cl_6 + 2AlCl_3 + (AlCl_3)_x$ limited in this respect but other metals may be used in lieu of the aluminum.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A process of making hexachlorethane comprising introducing metallic aluminum and a halide of aluminum into carbon tetrachloride and subjecting the mixture to a temperature sufficient to cause the formation of hexachlorethane.

2. A process of making hexachlorethane comprising introducing metallic aluminum and aluminum chloride into carbon tetrachloride and subjecting the mixture to a temperature sufficient to cause the formation of hexachlorenthane.

3. A process of making hexachlorenthane comprising introducing metallic aluminum and aluminum chloride into carbon tetrachloride and heating the mixture at from 60 to 75° C.

4. A process of making hexachlorethane comprising introducing metallic aluminum and a halide of aluminum into carbon tetrachloride, heating the mixture at from 60 to 75° C., condensing vapors formed by said heating and returning the condensed liquids to the mixture.

5. A process of making hexachlorethane comprising introducing metallic aluminum and aluminum chloride into carbon tetrachloride, heating the mixture at from 60 to 75° C., condensing vapors formed by said heating and returning the condensed liquids to the mixture.

6. A process of making hexachlorethane comprising introducing metallic aluminum and a halide of aluminum into carbon tetrachloride, the carbon tetrachloride being present in sufficient excess to dissolve the hexachlorethane formed by the reaction, heating the mixture, condensing vapors formed by said heating, returning the condensed liquids to the mixture, separating the solution of hexachlorethane in carbon tetrachloride from the other products of the reaction mixture and then distilling the carbon tetrachloride from said solution.

7. In a process of making hexachlorethane comprising introducing metallic aluminum and aluminum chloride into carbon tetrachloride, the carbon tetrachloride being present in sufficient excess to dissolve the hexachlorethane formed by the reaction, heating the mixture, condensing vapors formed thereby, returning the condensed liquids to the mixture, separating the solution of hexachlorethane in carbon tetrachloride from the other products of the reaction mixture, distilling the carbon tetrachloride from said solution and then distilling by means of steam, the crude hexachlorethane remaining after the carbon tetrachloride has been removed.

8. In a process of making hexachlorethane comprising introducing metallic aluminum and a halide of aluminum into carbon tetrachloride, the carbon tetrachloride being present in sufficient excess to dissolve the hexachlorethane formed by the reaction, heating the mixture, condensing vapors formed by said heating and returning the condensed liquids to the mixture, separating the solution of hexachlorethane in carbon tetrachloride from the other products of the reaction mixture, distilling the carbon tetrachloride from said solution, then distilling by means of steam the crude hexachlorethane remaining after the carbon tetrachloride has been removed and condensing in a water spray the hexachlorethane evolved.

9. In a process of making hexachlorethane comprising introducing metallic aluminum and aluminum chloride into carbon tetrachloride, the carbon tetrachloride being present in sufficient excess to dissolve the hexachlorethane formed by the reaction, heating the mixture, condensing vapors formed thereby, returning the condensed liquids to the mixture, separating the solution of hexachlorethane in carbon tetrachloride from the other products of the reaction mixture, distilling the carbon tetrachloride from said solution, then distilling by means of steam the crude hexachlorethane remaining after the carbon tetrachloride has been removed, and condensing in a water spray the hexachlorethane evolved, separating the water from the condensate and drying the hexachlorethane.

10. In a process of making hexachlorethane comprising introducing metallic aluminum and a halide of aluminum into carbon tetrachloride, subjecting the mixture to a temperature sufficient to cause the formation of hexachlorethane and agitating the mixture.

GEORGE MAYNARD BARTLETT.